Oct. 16, 1962  R. O. SCOFIELD, SR., ET AL  3,058,555
ENGINE THROTTLE CONTROL APPARATUS

Filed Dec. 19, 1958  5 Sheets-Sheet 1

INVENTOR.
Robert O. Scofield, Sr. &
BY Leslie C. Wolcott
J. L. Carpenter
ATTORNEY Oct. 16, 1962  R. O. SCOFIELD, SR., ET AL  3,058,555
ENGINE THROTTLE CONTROL APPARATUS
Filed Dec. 19, 1958  5 Sheets-Sheet 2

INVENTORS
Robert O. Scofield, Sr. &
BY Leslie C. Wolcott

J. L. Carpenter
ATTORNEY

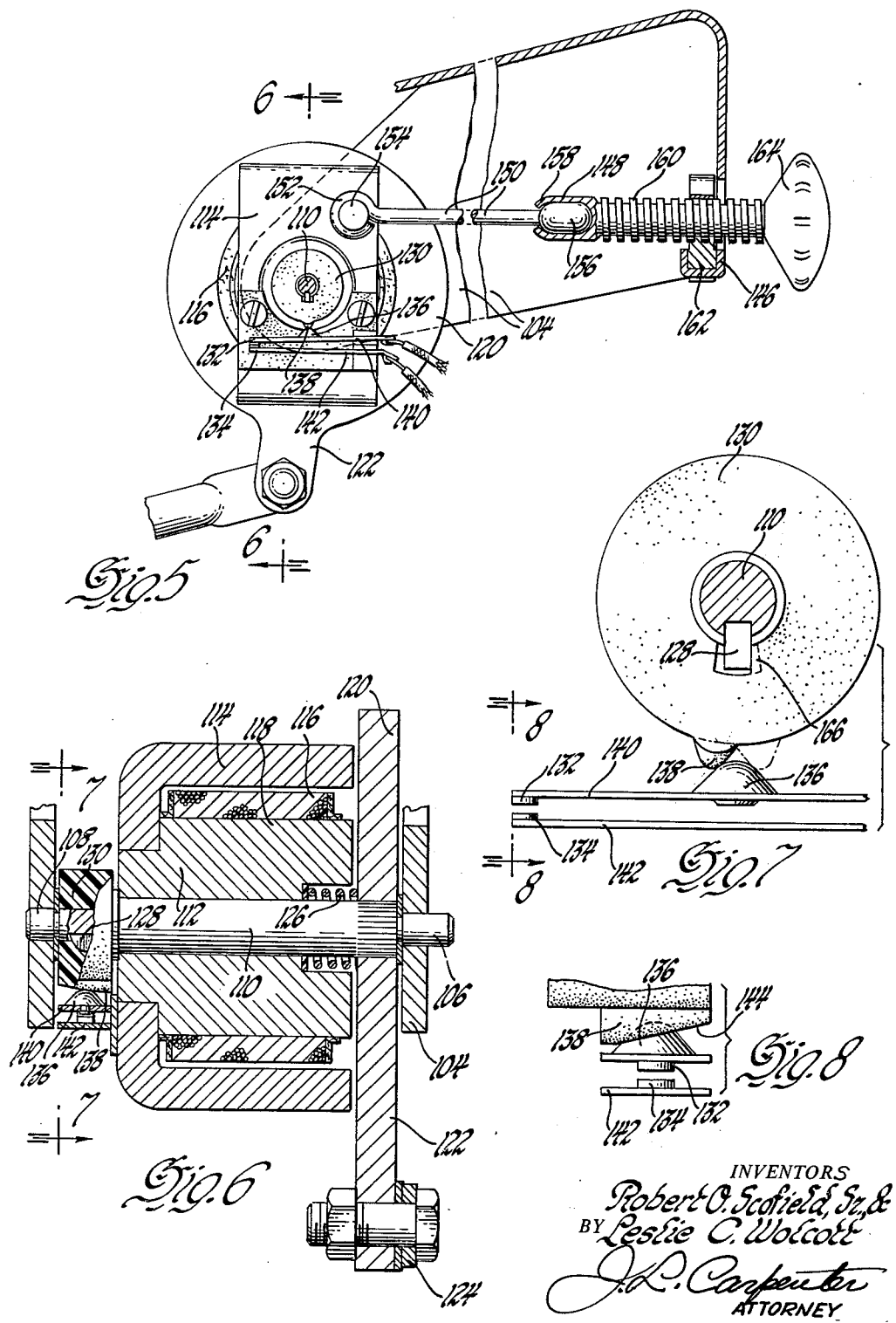

Oct. 16, 1962 R. O. SCOFIELD, SR., ET AL 3,058,555
ENGINE THROTTLE CONTROL APPARATUS
Filed Dec. 19, 1958 5 Sheets-Sheet 4

INVENTORS
Robert O. Scofield, Sr. &
BY Leslie C. Wolcott
J. L. Carpenter
ATTORNEY

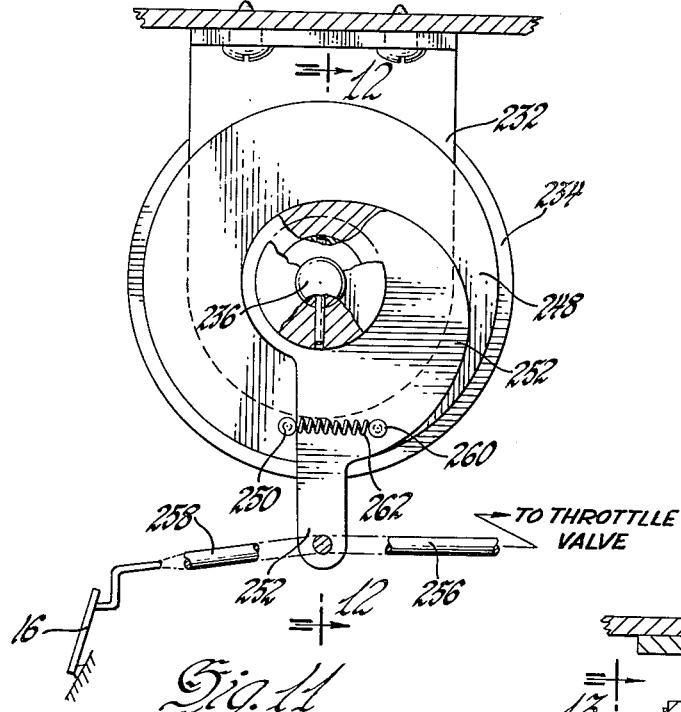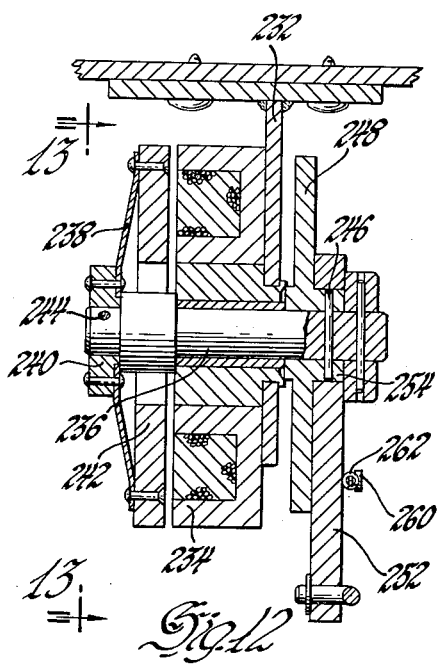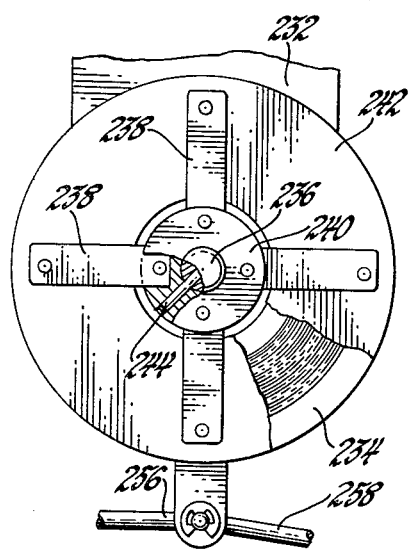

United States Patent Office 3,058,555
Patented Oct. 16, 1962

3,058,555
ENGINE THROTTLE CONTROL APPARATUS
Robert O. Scofield, Sr., and Leslie C. Wolcott, Warren, Ohio, assignors to General Motors Corporation, Detroit, Mich., a corporation of Delaware
Filed Dec. 19, 1958, Ser. No. 781,631
7 Claims. (Cl. 192—3)

This invention relates to means for holding the throttle valve of an internal combustion engine in any desired open position and more particularly to such devices wherein the throttle holding means may be overridden to accelerate the engine or may be rendered inoperative for braking of vehicles when installed as a part thereof.

Most of the present day automobiles and trucks no longer are equipped with a manual throttle control on the dashboard for feeding fuel to an internal combustion engine. Such vehicles instead rely entirely upon a foot-operated fuel accelerator pedal. There are occasions, however, after long or continuous periods of driving when an operator's foot tends to be cramped or otherwise uncomfortable from constant depression of the accelerator pedal. This is particularly true when driving at relatively constant speeds on open highways. The present invention has as its main object to relieve this condition and to make it easier and more comfortable for a vehicle operator during these long periods of continuous driving at relatively constant speeds on the open highway.

It is a further object of this invention to provide means which can be set to maintain the speed of the vehicle relatively constant but which will not interfere with any of the changes necessary for safe or proper operation of the vehicle such as sudden or gradual acceleration or sudden or gradual braking.

For the above and further objects of this invention and for a more complete understanding thereof, reference may be made to the accompanying detailed description and the drawings in which:

FIGURE 5 is a side view in elevation of a second form of the invention which includes means for setting the throttle hold device for a particular engine speed to which it may be returned after acceleration or braking the vehicle.

FIGURE 6 is a view taken substantially on the line 6—6 of FIGURE 5 showing certain details of construction of the electromagnetic clutch assembly and other component parts of the throttle hold device of FIGURE 5.

FIGURE 7 is a view taken on the line 7—7 of FIGURE 6 showing the manner in which switching contacts are closed to reenergize the electromagnet after acceleration and subsequent slowing down of the vehicle or braking and subsequent acceleration of the vehicle.

FIGURE 8 is a view taken substantially on the line 8—8 of FIGURE 7 illustrating details of the cam and button means utilized to close the contacts of the switch of FIGURE 7.

FIGURE 11 represents in elevation a fourth form of the invention.

FIGURE 12 is a view taken substantially on the line 12—12 of FIGURE 11 further illustrating details of the fourth embodiment.

FIGURE 13 is a view taken substantially on the line 13—13 of FIGURE 12.

Figure 1:
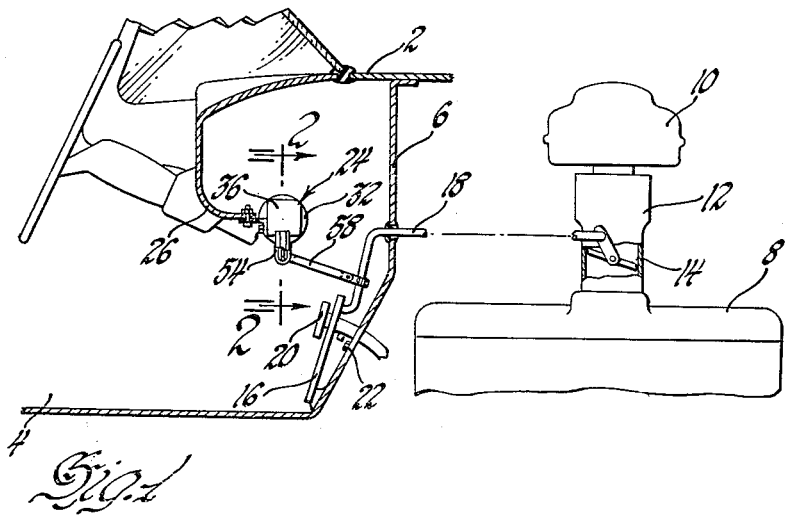
FIGURE 1 is a side elevation with parts broken away and in section of a portion of an automotive vehicle showing one general form of the invention applied thereto.

Referring first to FIGURES 1–4 which illustrate the first form of the invention and its application to an automotive vehicle, a portion of such a vehicle is shown and indicated by the numeral 2. Such vehicle includes the usual passenger compartment 4, fire wall 6 and an internal combustion engine 8 located forward of the fire wall. The engine 8 is provided with an air cleaner 10 and a carburetor 12 immediately above the usual butterfly throttle valve 14. Mounted on the floor of the vehicle within the passenger compartment 4 is an accelerator or throttle pedal 16 which when depressed by the operator's foot acts through the linkage 18 to control the butterfly throttle valve 14 and the speed of the engine 8. Also shown in the passenger compartment 4 is the usual brake pedal 20 which when depressed brakes the vehicle in a conventional manner. The brake pedal 20 when depressed operates a brake switch 22 whose purpose will be more fully explained later in the specification.

The throttle hold means which forms the primary subject matter of this invention is indicated generally in FIGURE 1 by a numeral 24 and is mounted to the lower edge of the vehicle instrument panel 26 by a bracket 28 bolted or otherwise fixed thereto by studs such as 30.

Figure 2:
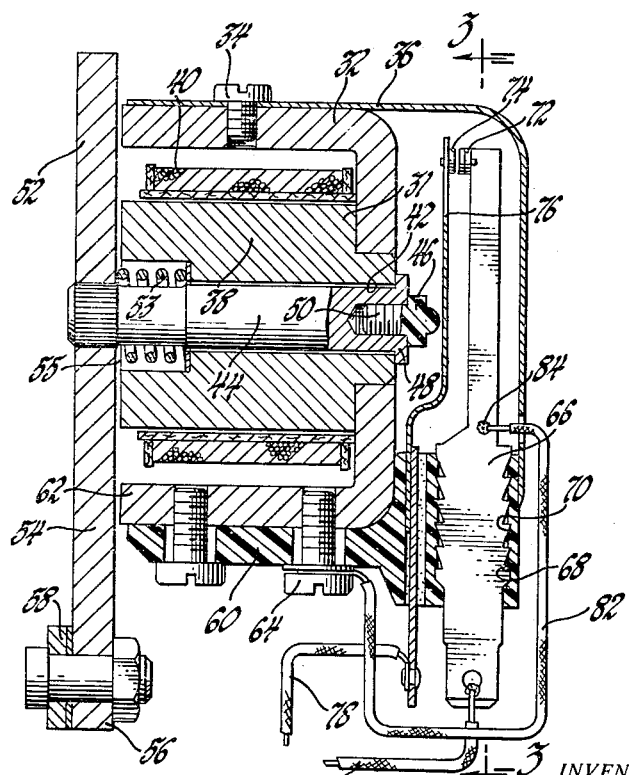
FIGURE 2 is a view taken substantially on the line 2—2 of FIGURE 1 and greatly enlarged with parts shown in section to illustrate certain of the details of the throttle holding device of FIGURE 1.
Figure 3:
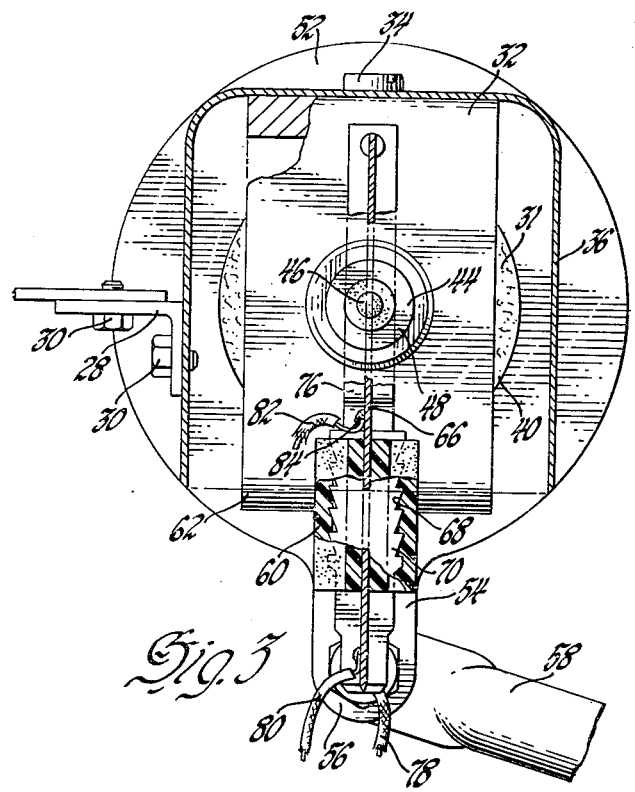
FIGURE 3 is a view taken substantially on the line 3—3 of FIGURE 2 again showing certain parts in section and further details of construction of the throttle holding means of FIGURE 1.

Referring now particularly to FIGURES 2 and 3, it will be observed that the assembly 24 comprises an electromagnet 31 including a yoke 32 which is fastened by studs 34 to a sheet metal support 36 in turn supported by the bracket 28. The yoke embraces and has fixed thereto an iron core 38 about which is wound a magnetic coil 40. Journaled for rotation in a bore 42 in core 38 is a shaft 44 having an insulated button 46 anchored in one end 48 thereof by a threaded shank 50. The opposite end of shaft 44 has splined thereon an armature plate 52 which is adapted to rotate with shaft 44. A small helical coil spring 53 is located in one end 55 of core 38 which tends to bias apart the armature 52 and the core 38 along the axis of the shaft 44. The armature plate 52 is provided with an arm section 54 which has pivotally attached to its free end 56 thereof one end of an articulated linkage assembly 58. The other end of linkage 58 is pivotally attached to linkage 18. Thus it will be observed that the throttle hold device is actually fastened or connected between a support (in this case the instrument panel) and the engine throttle, i.e., the throttle valve 14 via the linkages 58 and 18.

Referring again for a moment to FIGURES 2 and 3 it will be observed that an insulating bracket 60 is secured to the lower part 62 of yoke 32 by studs 64. This insulating bracket supports a conducting member 66 which is retained in a socket 68 in the insulating bracket because of the saw-teeth 70 which interfere with the inner surface forming socket 68. The conducting member 66 has provided at an upper end thereof an electrical contact 72 which is adapted to be engaged by a second electrical contact 74 mounted on a movable reed-like contact carrier 76 which also acts as a conductor. Carrier 76 is also anchored in the insulating bracket 60 and has fixed to a lower end thereof a flexible conductor 78. A conductor 80 is also connected to the lower end of the conducting member 66. The coil or winding 40 has one end thereof connected via one of the studs 64 and flexible conductor 82 to the conducting member 66 at 84. The other end of the coil or winding 40 is suitably connected to ground 86 (see FIGURE 4).

Figure 4:
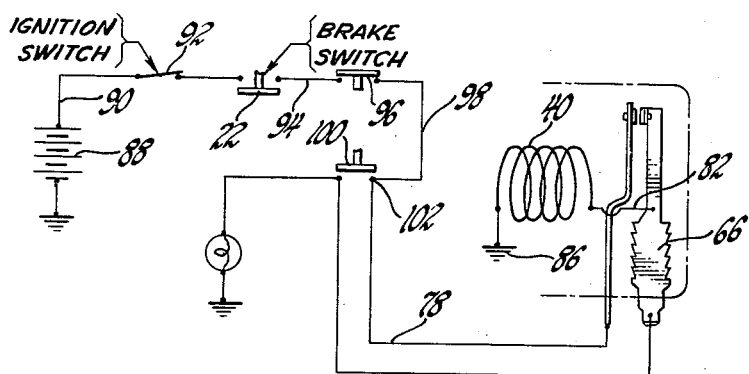
FIGURE 4 is a schematic diagram of the electrical circuitry used to control an electromagnetic clutch portion of the throttle holding device of FIGURES 2 and 3.

Referring now particularly to FIGURE 4, there is shown as a part of the vehicle a voltage source such as the battery 88 having one side grounded and the other side extending via conductor 90 and ignition switch 92 to the aforementioned brake switch 22, which as indicated opens when the brake pedal 20 is depressed. Continuing the circuitry from the positive side of the battery, after the brake switch 22 there is a conductor 94 leading to a switch 96 which when open renders the throttle hold device inoperative. Following the switch 96 is a conductor 98 leading to a switch 100 which is normally biased to an open position but which may be momentarily depressed to connect conductor 98 with conductor 80 leading to the conducting member 66 and via the conductor 82 to the winding or coil 40 of the electromagnet. The conductor 98 also is shown as being permanently connected at the junction 102 to the conductor 78 which leads to the lower end of the flexible contact carrier 76. The operation of the form of the invention shown in FIGURES 1, 2, 3 and 4 is as follows:

Assuming first that the ignition switch 92 has been closed and that the vehicle is being propelled along at a certain rate of speed by means of the position of the operator's foot on the accelerator pedal 16 and that the operator desires to maintain this pedal position, i.e., throttle setting of throttle 14 he would momentarily depress the switch 100. This would connect the battery 88 to the coil 40 of the electromagnet 31 via the conductor 90, ignition switch 92 and brake switch 22, conductor 94, normally closed switch 96, conductor 98, now closed switch 100, conductor 80, conducting member 66, and conductor 82. Energization of the electromagnet 31 will set up a magnetic circuit through the core 38 and the armature 52 causing the armature 52 to move axially toward the core 38 and the yoke 62 against the bias of the spring 53. This attraction of the core 38 and the armature 52 will hold these two members together and prevent their relative rotation. Since the electromagnet 31 is fixed by the yoke 62 and the sheet metal support or frame 36 to the instrument panel 26, the accelerator pedal 16 and the throttle 14 will be maintained in whatever position they were in at the time the operator closed the switch 100.

It will be noted that as the armature 52 and the core 38 move together the shaft 44 will move axially through the bore 42 so that the button 46 engages the contact carrier 76 to thereby close switching contacts 72, 74. Closure of switching contacts 72, 74 sets up a holding circuit which maintains the electromagnet 31 energized so that the operator can remove his hand from the switch 100 which will then open. The electromagnet will remain energized by the holding circuit which includes one side of the battery 88, conductor 90, ignition switch 92, brake switch 22, conductor 94, switch 96, conductor 98, conductor 78, contact carrier 76, the now closed contacts 72, 74, conducting member 66 and conductor 82. Thus the operator may remove his foot from the accelerator pedal and his hand from the switch 100 and the throttle setting will be maintained without any further effort on the part of the operator. If the operator should subsequently desire to suddenly stop or retard the speed of the vehicle, it would be undesirable to maintain the fixed throttle setting. Accordingly, as the operator depresses the brake to slow down the vehicle, the brake switch 22 will open. Opening of brake switch 22 disconnects the voltage source 88 from the energizing coil 40 of the electromagnet 31. Deenergization of the coil 40 allows the core 38 and the armature 52 to move apart under the influence of the spring 53 thereby opening the contacts 72, 74. The throttle holding device is thus ready to be reset by depression of the switch 100 after the operator has again accelerated to the desired speed. Should the operator have the throttle holding device in operation and wish to accelerate the vehicle, although not shown, this could be accomplished by a simple lost-motion linkage in lieu of linkage 58 which would allow the effective length of linkage 58 to elongate but which would prevent accelerator pedal 16 from moving away from the floor from the position in which it has been set. One example of such a lost-motion linkage is shown in FIGURES 11, 12 and 13 and will be described later.

In the other forms of the invention to be described hereinafter, it is emphasized that the electrical circuitry shown in FIGURE 4 is applicable thereto as well as to the first form thereof. Also, the throttle hold device may be supported in the same manner as the throttle hold means 24 of FIGURE 1. Additionally, each of the forms of the invention yet to be described may be connected to the throttle valve 14 in a manner similar to the connection of the throttle hold means 24 of FIGURE 1.

Turning now to FIGURES 5, 6, 7 and 8, a second form of the invention is shown. This form includes a feature which is not present in the first form. It will be recalled from the description of the first form of the invention that if the operator should depress his brake, the throttle hold means will be rendered inoperative and it is necessary for him to reset the throttle hold means by again accelerating the vehicle to the desired speed and then re-depressing the switch 100. The second form of this invention shown in FIGURES 5–8 obviates the need of resetting the throttle hold device.

Referring now to FIGURES 5–8, the instrument panel 26 of FIGURE 1 is adapted to have connected thereto a bracket 104 which has journaled therein opposite ends 106 and 108 of a shaft 110. Shaft 110 supports for rotation thereon an electromagnet member 112 which is similar to the electromagnet of the first form of the invention and includes yoke 114, winding 116 and core 118. Splined to shaft 110 so as to rotate therewith is an armature member 120 which is provided with an arm 122 adapted to be connected by link 124 to the engine throttle. The electromagnet 112 and the armature 120 are biased apart along the axis of the shaft 110 by the helical coil spring 126. Also mounted on the shaft 110 and keyed to rotate therewith as indicated at 128 is a cam switch actuator 130 made of some suitable insulating material. Fixed to the yoke 114 immediately below the cam 130 is a pair of switch contacts 132, 134 which may be moved into contact with each other by means of the actuating button 136 being engaged by a lobe 138 on cam member 139. The contacts 132 and 134, including their respective carrying members 140, 142, correspond to and serve the same function as the contacts 72, 74 and the members 66, 76 of FIGURE 2, i.e., when contacts 132, 134 are closed they energize electromagnet 112 and when opened deenergize it.

In FIGURE 8 it will be noted that the lobe 138 is formed on a bias or with an inclined surface 144 whose purpose will appear in the description of the operation of the form of the invention now being described.

From FIGURE 5 it may be seen that extending between the yoke 114 and a downwardly extending portion 146 of the bracket 104 is a linkage assembly 148. This linkage assembly includes a rod 150 having an eylet 152 at one end thereof embracing a pin 154 on the yoke 114. The opposite end 156 of rod 150 is bulbous and resides in a socket 158 on the end of a threaded member 160 which is threaded through a nut 162 secured in the lower portion 146 of bracket 104. The opposite end of the threaded member 160 is provided with a handle 164 which may be turned to change the effective length of the linkage extending between the portion 146 and yoke 114 so as to cause turning of the yoke on the shaft 110 relative to the armature 120.

Turning again for a moment to FIGURES 6 and 7, although the cam 130 is keyed to shaft 110 so as to turn therewith, it will be observed that there is a certain amount of lost motion provided by the size of the keyway 166 for a purpose which will appear shortly.

The operation of this form of the invention is as follows: Again assuming the operator has depressed the accelerator pedal so that the vehicle is moving at a desired rate of speed and the operator wishes to hold the throttle open so as to substantially maintain this speed, he will start turning the handle 164 to cause the threaded member 160 to move to the right as viewed in FIGURE 5. As he does so, the button 136 on the contact carrier 140 will move clockwise engaging the lobe 138 on cam 130 as viewed in FIGURE 5. As the button 136 engages the lobe 138, the lost motion between the key 128 and the key-way 166 will be taken up on the contacts 132, 134 will close, thereby energizing the electromagnet 112 causing the electromagnet and its armature 120 to become fixed with respect to each other thereby maintaining the throttle in a set position. At this time the electromagnet 112 and yoke 114 will be moved to the right from the position illustrated in FIGURE 6 into engagement with the armature 120 and against the bias of the spring 126, this causes the button 136 to move to the left with respect to the lobe 138 as viewed in FIGURE 8, assuring that a firm contact will be maintained between contacts 132, 134 and also tending to prevent lobe 138 from passing over the button 136. If now the operator should desire to accelerate the vehicle, he will press harder on the accelerator thereby overcoming to some degree the magnetic attraction between the armature 120 and the electromagnet 112. Pressing hard on the accelerator will cause link 124 to move to the left and armature 120, shaft 110 and cam 130 to rotate clockwise as viewed in FIGURE 5. Thus the lobe 138 will move clockwise over the button 136 after which the contacts 132, 134 will open. Opening of the contacts 132, 134 will deenergize the electromagnet and leave the operator free to accelerate in the manner he desires. When the operator removes his foot from the accelerator to allow the automobile to decelerate to the desired speed, the armature 120 and the shaft 110 will turn counterclockwise as viewed in FIGURE 5 until the lobe 138 again engages the button 136 causing the contacts 132, 134 to close, thereby again holding the throttle in the desired position. It will be noted, however, that in this latter case the lobe is on the opposite side of the button 136. It is for this reason that the lost motion between the key 128 and the key-way 166 has been provided. In other words, this lost motion is necessary to allow the armature 120 and the electromagnet 112 to take up the same angular position with respect to each other on the shaft 110 regardless of whether the lobe 138 is on one side of the button or the other. If the operator desires to decelerate the vehicle, he will depress the brake pedal in which case the electromagnet will again be deenergized and the lobe 138 will move to the right of the button 136 when viewing FIGURE 7. Upon subsequent acceleration, the lobe 138 will again engage the button 136 but again on an opposite side thereof.

Figure 9:
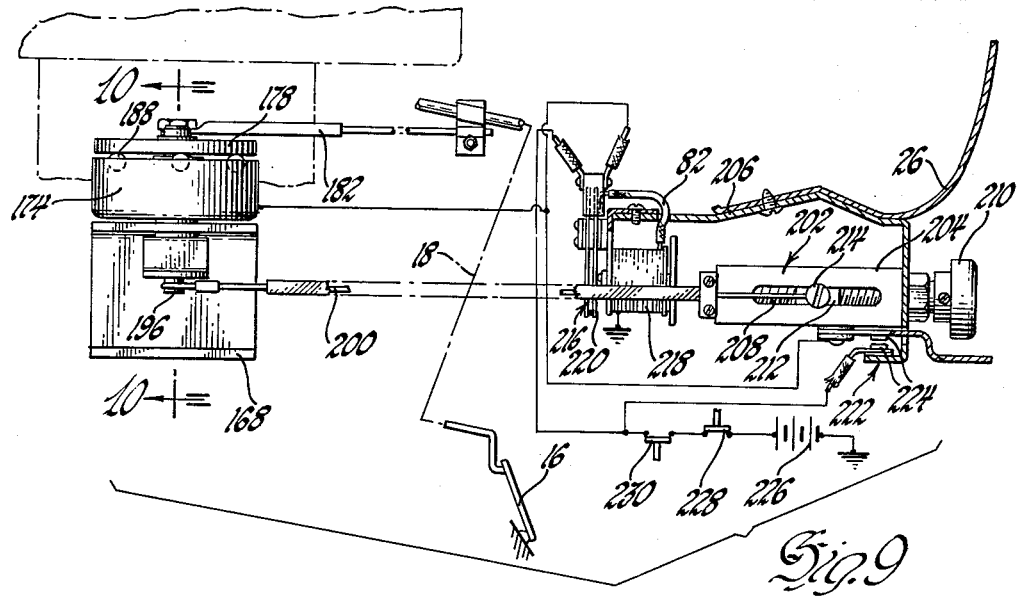
FIGURE 9 represents a view of still another form of the invention wherein the electromagnetic clutch is provided with yieldable detent means enabling the throttle to be returned to a predetermined desired open position.
Figure 10:
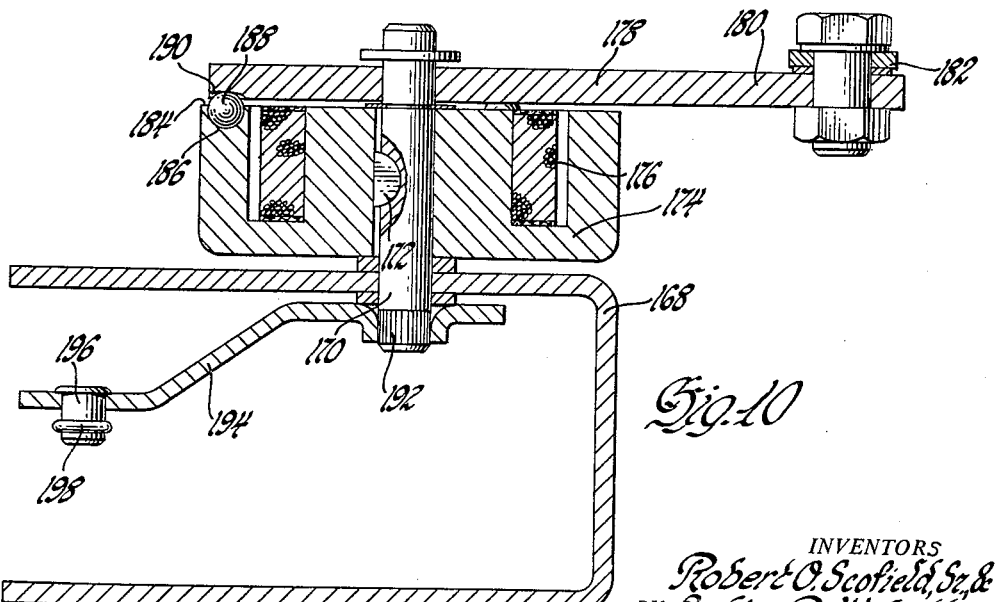
FIGURE 10 is a view taken substantially on the line 10—10 of FIGURE 9 with parts in section illustrating the details of the electromagnetic clutch forming an important part of the invention and also the detent means used between the two primary components of the clutch.

A third form of the invention is shown in FIGURES 9 and 10. Referring now to those figures, a frame 168 is shown journaling a shaft 170 to which is keyed by the key 172 an electromagnet member 174 including a winding 176. Mounted on the shaft 170 is an armature 178 having an arm 180 which is adapted to be connected to the throttle pedal 16 via the linkage 182. The throttle pedal 16, as previously indicated, is connected to an engine throttle by the linkage 18. An axially facing surface 184 is provided adjacent the outer periphery of the electromagnet 174 with recesses or pockets 186 in which there are ball bearings 188. Any number of ball bearings 188 may be used, although in the present form three has been considered preferable. The armature 178 is also provided with recesses 190 which, at certain angular relationships of the electromagnet and the armature on the shaft 170, are in alignment so that the balls 188 reside in both the pockets 186 and the recesses 190. An opposite end 192 of shaft 170 is splined and has secured thereon a lever or arm 194. The arm 194 is provided with a pin 196 to which is secured one end 198 of a Bowden wire 200. The opposite end of the Bowden wire is anchored to an adjustable assembly indicated generally by the numeral 202. Assembly 202 includes a housing or frame 204 which is rigidly supported by a bracket 206 secured to the lower part of the dash or instrument panel 26. Extending longitudinally through the housing 204 and journaled for rotation therein is a screw 208 adapted to be turned or rotated by the nob 210. A traveling nut 212 is threaded on the screw 208 and is provided with a set screw 214 which anchors the opposite end of the Bowden wire 200. Also secured to the bracket 206 is a solenoid-operated switch assembly indicated generally by a numeral 216. This switch includes a solenoid member 218 which when energized closes the contacts 220. The embodiment of the invention shown in FIGURES 9 and 10 utilizes circuitry similar to that shown in FIGURE 4.

The operation of this third form of the invention is as follows: After the operator has accelerated the vehicle to the desired speed in the conventional manner, he then turns the nob 210 until the balls 188 and shaft 170 and electromagnet 174 in recesses 186 also reside in the recesses 190 of the armature 178. A switch 222 including contacts 224 may then be manually closed to connect the battery 226 to both electromagnet 174 and solenoid 218 via the normally closed brake switch 228 and a normally closed deactivating switch 230. Energization of solenoid 218 causes closure of its associated contacts 220 to thereby set up a holding circuit maintaining solenoid 218 and the electromagnet 174 energized after switch 222 may be released. Thus the throttle will now be yieldably retained by both the magnetic attraction between the electromagnet and armature 178 as well as by the engagement of the balls 188 in both the pockets 186 and 190. Braking of the vehicle will render inactive the throttle hold device in a manner similar to that described for the first and second forms of the invention. It will be noted, however, that the Bowden wire and the lever 194 will maintain the electromagnet 174 in the pre-established desired position so that if the vehicle is accelerated or braked, the vehicle may be decelerated or accelerated to rotate the armature 178 on shaft 170 until the balls 188 are again engaged in the recesses 190. In other words, this is a so-called "memory" type of throttle hold device which allows the usual necessary accelerating and decelerating functions of the vehicle while maintaining the location of the electromagnet to assure that the throttle may be returned to the preselected desired position.

A fourth form of the invention is shown in FIGURES 11, 12 and 13. This fourth form includes a bracket support 232 which has fixed thereto an electromagnet member 234. Electromagnet member 234 journals a shaft 236 to which is secured by the band springs 238 and the ring 240 an armature 242. The armature 242, although free, because of the flexibility of the spring 238, to move limitedly axially with respect to shaft 236, rotates therewith because of pin 244. Also fixed to rotate with shaft 236 because of a pin 246 is a plate 248 which is provided with a stop 250. An arm 252 is journaled for rotation on an axially extending boss 254 of plate 248. Arm 252 is adapted to be connected as indicated in FIGURE 11 via the links 256 and 258 to an engine throttle valve and the accelerator pedal 16. The arm 252 is provided with a pin 260. Extending between the stop 250 and the pin 260 is a spring 262 which urges the arm 252 against stop 250.

The form of the invention of FIGURES 11, 12 and 13 works as follows: Again the electromagnet 234 is energized after a desired open throttle position has been obtained in which instance the armature 242 is attracted to the electromagnet 234 to thereby hold the plate 248 which has been placed in the desired position as a result of the link 258 acting on the arm 252 and the spring 262 extending between the stop 250 and the pin 260. It will thus be seen that the stop 250 as long as the electromagnet 234 is energized will remain stationary as a result of the attraction between the electromagnet 234 and the armature 242. If the operator desires to accelerate, however, he may do so without interfering with the operation of the throttle hold means. He merely further depresses the accelerator which he may do because of the presence of the yielding spring 262. When he removes his foot from the accelerator, however, the spring 262 will again urge the arm 252 against the stop 250 whose location determines the desired operating position of the throttle.

We claim:

1. Means for establishing a position in which to hold an engine throttle and means for holding the throttle in such position, said establishing and holding means comprising a support, a magnetic brake including an electromagnet member and an armature member mounted on a common shaft rotatably supported by said support, one of said magnetic brake members being fixed thereto and the other of said magnetic brake members being rotatable thereon, adjustable means connecting one of said members to said support to establish the throttle hold position, the other of said members being connected to a throttle, means responsive to the relative rotatable position of said members on said shaft to energize said magnetic brake, and means for inactivating said magnetic brake.

2. In a vehicle including braking means therefor and an internal combustion engine including a throttle, means for establishing a certain position in which to hold said throttle and means for holding said throttle in such position, said establishing and holding means comprising a support, a magnetic brake including an electromagnet member and an armature member mounted on a common shaft rotatably supported by said support, one of said magnetic brake members being fixed to said shaft to rotate therewith and the other being rotatable thereon, one of said members being fixed to move axially with said shaft and the other to move axially thereon, biasing means between said members tending to separate them axially on said shaft, adjustable means connecting one of said members to said support to establish said certain throttle position, the other of said members being connected to said throttle, a voltage source, normally open switch contacts closable by axial movement of said members toward each other, a holding circuit including said electromagnet member and said switch contacts and said source, switching means normally biased to open position between said source and said electromagnet member and closable to connect said electromagnet member to said source, and a normally closed brake switch in said holding circuit responsive to operation of said braking means to deenergize said holding circuit and magnetic brake.

3. The structure of claim 2 in which said adjustable means comprises a link having an end fastened to one of said members radially spaced from said shaft and connected at its opposite end to said support, and means for varying the effective length of said link to thereby vary the angular position of said members on said shaft with respect to each other.

4. In a vehicle including an internal combustion engine having a throttle, means for establishing a certain position in which to hold said throttle and means for holding said throttle in such position, said establishing and holding means comprising a support, a magnetic brake including an electromagnet member and an armature member mounted on a common shaft rotatably supported by said support, one of said members being fixed to said shaft to rotate therewith and the other being rotatable thereon, one of said members being fixed to said shaft to move axially therewith and the other being movable axially thereon, one of said members being connected to said throttle, a link connected at one end to the other of said members radially spaced from the axis of said shaft, the opposite end of said link being connected to said support, means for varying the effective length of said link to vary the angular position of said members on said shaft with respect to each other to establish said certain throttle position, and means operable to energize and deenergize said magnetic brake.

5. In a vehicle including an internal combustion engine having a throttle, means for establishing a certain position in which to hold said throttle and means for holding said throttle in such position, said establishing and holding means comprising a support, a magnetic brake including an electromagnet member and an armature member mounted on a common shaft rotatably supported by said support, one of said members being fixed to said shaft to rotate therewith and the other being rotatable thereon, one of said members being fixed to said shaft to move axially therewith and the other being movable axially thereon, one of said members being connected to said throttle, a link connected at one end to the other of said members removed from the axis of said shaft, the opposite end of said link being connected to said support, means for varying the effective length of said link to vary the angular position of said members on said shaft with respect to each other to establish said certain throttle position, means responsive to the relative rotational position of said members on said shaft to energize said magnetic brake, and means to deactivate said magnetic brake.

6. Means for yieldingly holding an engine throttle in any desired open position comprising a support, a magnetic brake including an electromagnet member and an armature member mounted on a common shaft rotatably supported by said support, one of said magnetic brake members being fixed to rotate with the shaft and the other of which may rotate thereon, means connecting one of said members to said support and the other of said members to said throttle, each of said members having a recess in an axially facing surface thereof, a ball bearing in one of said recesses and adapted to enter the other and between said members and retained in said one recess by the proximity of said members to each other on said shaft, means for adjusting the angular position of said members on said shaft relative to each other, and means operable to energize and deenergize said electromagnet, said recesses and ball bearing serving to define a relative angular position of said members corresponding to a desired open position of such throttle from which they may be moved by movement of such throttle.

7. Means for holding an engine throttle in any desired open position comprising a support, a magnetic brake including an electromagnet member and an armature member mounted on a common shaft rotatably supported by said support, one of said magnetic brake members being fixed thereto and the other of which may rotate thereon, means tending to bias said members apart on said shaft, a link journaled on said shaft and connected to said throttle, a plate fixed to said shaft to rotate therewith, a stop on said plate engageable by said link, a pin on said link and biasing means extending between said stop and said pin urging said link into engagement with said stop, and means operable to energize and deenergize said magnetic brake.

References Cited in the file of this patent

UNITED STATES PATENTS

| | | |
|---|---|---|
| 2,270,002 | Glick | Jan. 13, 1942 |
| 2,638,016 | Munson | May 12, 1953 |
| 2,765,058 | Struthers | Oct. 2, 1956 |
| 2,765,671 | Francis | Oct. 9, 1956 |
| 2,822,902 | Glick | Feb. 11, 1958 |
| 2,891,417 | Beegle | June 23, 1959 |
| 2,916,116 | Eddy et al. | Dec. 8, 1959 |
| 2,945,104 | Jaeschke | July 12, 1960 |